US012654614B2

(12) United States Patent
Kumar et al.

(10) Patent No.: US 12,654,614 B2
(45) Date of Patent: Jun. 16, 2026

(54) VEHICLE ILLUMINATION ALIGNMENT SYSTEMS AND METHODS

(71) Applicant: Rivian IP Holdings, LLC, Irvine, CA (US)

(72) Inventors: Priyank Kumar, Ypsilanti, MI (US); Shammika Ashan Wickramasinghe, Trabuco Canyon, CA (US); Yifu Xiao, Costa Mesa, CA (US); Carlos Montes-Relanzon, Trabuco Canyon, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/040,790

(22) Filed: Jan. 29, 2025

(65) Prior Publication Data

US 2025/0263010 A1      Aug. 21, 2025

Related U.S. Application Data

(60) Provisional application No. 63/554,069, filed on Feb. 15, 2024.

(51) Int. Cl.
| | |
|---|---|
| B60Q 1/076 | (2006.01) |
| B60R 1/24 | (2022.01) |
| F21S 41/657 | (2018.01) |
| F21W 102/30 | (2018.01) |
| F21Y 115/10 | (2016.01) |

(52) U.S. Cl.
CPC ............... B60Q 1/076 (2013.01); B60R 1/24 (2022.01); F21S 41/657 (2018.01); B60Q

2200/30 (2013.01); B60R 2300/20 (2013.01); F21W 2102/30 (2018.01); F21Y 2115/10 (2016.08)

(58) Field of Classification Search
CPC ... B60Q 1/076; B60Q 2200/30; F21S 41/657; B60R 1/24; B60R 2300/20; F21Y 2115/10; F21W 2102/30
See application file for complete search history.

(56) References Cited

U.S. PATENT DOCUMENTS

| | | | | |
|---|---|---|---|---|
| 2012/0253593 A1* | 10/2012 | Tran ...................... | B60W 50/16 |
| | | | 701/36 |
| 2015/0149045 A1* | 5/2015 | Mizuno ................... | B60Q 1/08 |
| | | | 701/49 |
| 2020/0324701 A1* | 10/2020 | Usui ...................... | H04N 23/90 |
| 2021/0162927 A1* | 6/2021 | Takii ........................ | B60Q 1/50 |
| 2023/0362495 A1* | 11/2023 | Ozawa ................... | B60K 35/22 |

* cited by examiner

*Primary Examiner* — Bao Q Truong
(74) *Attorney, Agent, or Firm* — Patterson + Sheridan, LLP

(57)      ABSTRACT

In certain embodiments, a method of configuring an illumination source associated with a vehicle includes causing, by a vehicle control system, the illumination source to direct light towards a target. The method also includes determining, at the vehicle control system, at least one image captured with the directed light. The method also includes causing, by the vehicle control system, the at least one image to be displayed. The method also includes determining, at the vehicle control system, an input relative to the at least one image. The method also includes triggering, by the vehicle control system, a positioning of the illumination source based on the input.

20 Claims, 10 Drawing Sheets

221C

260

265

221B

250

253

256

700A

739A

700B

739

743

739B

VEHICLE ILLUMINATION ALIGNMENT SYSTEMS AND METHODS

RELATED APPLICATION

This application claims the benefit of U.S. Application Ser. No. 63/554,069 filed Feb. 15, 2024, and entitled VEHICLE ILLUMINATION ALIGNMENT SYSTEMS AND METHODS, which is hereby incorporated herein by reference in its entirety

INTRODUCTION

The present disclosure relates to illumination provided by vehicles, and more particularly, but not by way of limitation, to vehicle illumination alignment.

SUMMARY

In certain embodiments, one general aspect includes a method of configuring an illumination source associated with a vehicle. The method includes causing, by a vehicle control system, the illumination source to direct light towards a target. The method also includes determining, at the vehicle control system, at least one image captured with the directed light. The method also includes causing, by the vehicle control system, the at least one image to be displayed. The method also includes determining, at the vehicle control system, an input relative to the at least one image. The method also includes triggering, by the vehicle control system, a positioning of the illumination source based on the input.

In certain embodiments, another general aspect includes an illumination configuration system for a vehicle. The illumination configuration system includes an illumination source of the vehicle and a vehicle control system communicatively coupled to the illumination source. The vehicle control system is configured to cause the illumination source to direct light towards a target and determine at least one image captured with the directed light. The vehicle control system is further configured to cause the at least one image to be displayed. The vehicle control system is further configured to determine an input relative to the at least one image and trigger a positioning of the illumination source based on the input.

In certain embodiments, another general aspect includes a computer-program product including a non-transitory computer-usable medium. The non-transitory computer-usable medium has computer-readable program code embodied therein. The computer-readable program code is adapted to be executed to implement a method. The method includes causing, by a vehicle control system, an illumination source associated with a vehicle to direct light towards a target. The method also includes determining, at the vehicle control system, at least one image captured with the directed light. The method also includes causing, by the vehicle control system, the at least one image to be displayed. The method also includes determining, at the vehicle control system, an input relative to the at least one image. The method also includes triggering, by the vehicle control system, a positioning of the illumination source based on the input.

DETAILED DESCRIPTION

Typical headlamp aiming processes are cumbersome and often require an intricate understanding of optics and applicable safety standards or protocols. For example, such processes may involve the use of measuring tape to ensure proper orientation of a vehicle relative to a wall and to determine an appropriate headlamp aim. Thereafter, fasteners (e.g., screws or bolts) coupled to the headlamps may need to be manipulated by a user to implement any adjustments. Due to the complexity, typical headlamp aiming processes are unsuitable for most users.

Adding to the above problems, some vehicles offer variable ride heights, for example, to accommodate different off-road or on-road scenarios (e.g., 7, 8, or 9 different ride height configurations). In some such vehicles, headlamp aim is typically set for a nominal or all-purpose drive mode. Accordingly, the aim may be less than optimal for other ride heights. As mentioned above, adjustment to accommodate any other height is slow, burdensome, and generally impractical for most users.

In various aspects of the present disclosure, a vehicle system can facilitate positional adjustments to an illumination source, such as a headlamp or fog lamp. In some cases, the vehicle system can guide a user in orienting a vehicle relative to a target, such as a wall, in satisfaction of criteria such as a minimum distance (e.g., 20 feet). Thereafter, the illumination source can direct light to the target (e.g., using fewer than all lamps of the illumination source). In certain aspects, a vehicle display (e.g., an infotainment display) can display images (e.g., a live video feed) of the directed light in relation to a visual indicator of a region of interest for the illumination source (e.g., via a crosshair overlay on the live video feed). The vehicle system can determine inputs (e.g., user inputs) relative to the live video feed, such as horizontal or vertical adjustments to a position of the illumination source, and can cause the illumination source to be positioned based on the user inputs. In various embodiments, information related to each positioning of the illumination source can be stored for later use and/or later presentation to the user. The above-described positioning process can be repeated, for example, for different illumination sources (e.g., different headlamps or fog lamps) and/or for different ride heights.

Figure 1:
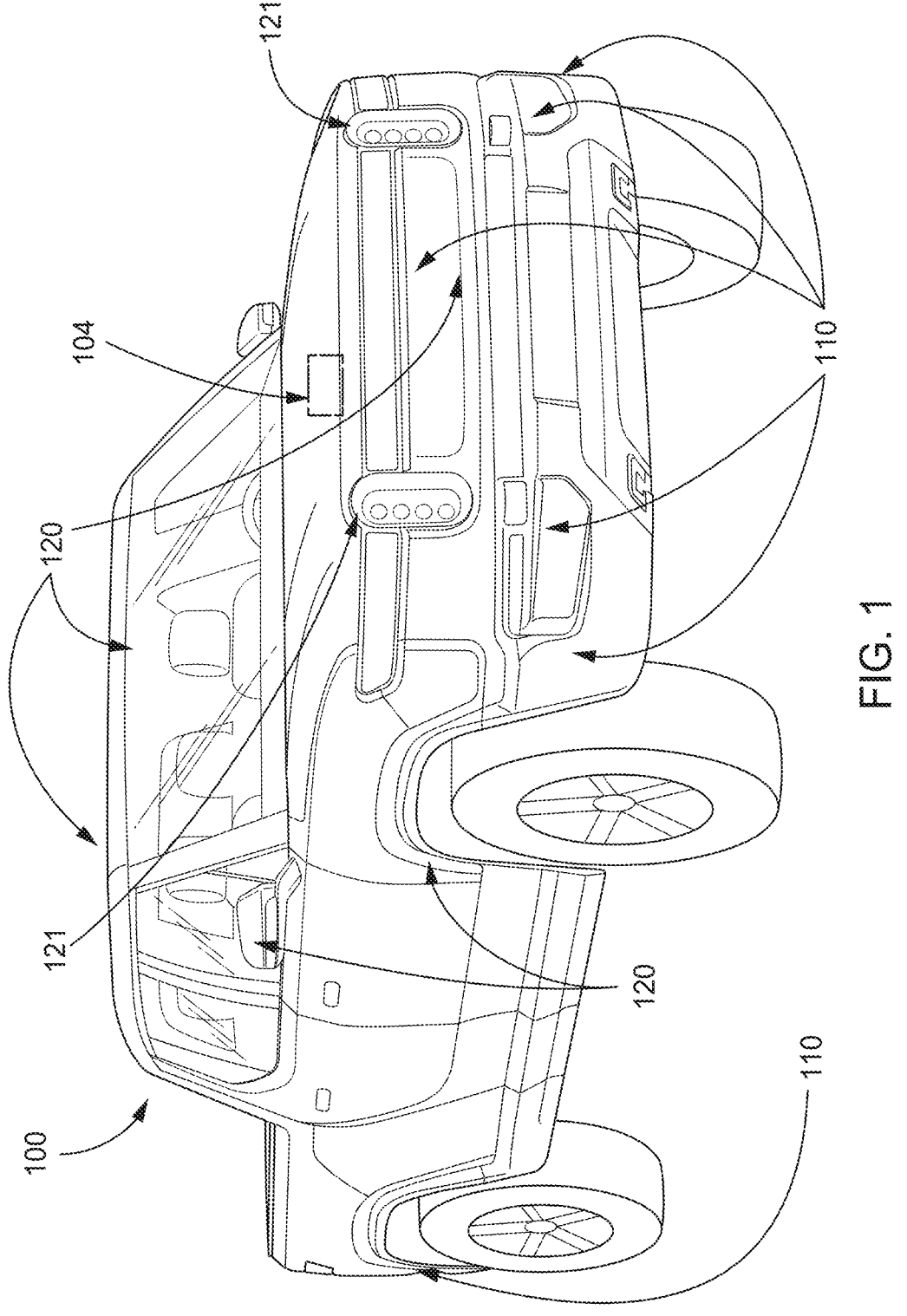
FIG. 1 illustrates an example of a vehicle, in accordance with certain embodiments of the present disclosure.

FIG. 1 illustrates an example vehicle 100, in accordance with certain embodiments of the present disclosure. Vehicle 100 can include multiple sensors 110, multiple cameras 120, multiple illumination sources 121, and a control system 104. As an example and not by way of limitation, the sensors 110 can be, or include, an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, a motion sensor, another suitable sensor, or a combination thereof. As an example and not by way of limitation, a camera 120 can be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 100 can include various controllable components (e.g., doors, seats, windows, lights, HVAC, entertainment system, security system) and instrument and information displays and/or interactive interfaces.

While FIG. 1 depicts one or more of cameras 120 in particular locations, it should be appreciated that any suitable number of cameras can be employed (e.g., any number of cameras positioned at a front, rear, and each side of vehicle 100). Such cameras 120 can be mounted at any suitable respective positions or portions of vehicle 100 in order to facilitate the capturing of images of the entire region or environment around vehicle 100, while vehicle 100 is stationary or in motion. A series of images can be captured by cameras 120, including any suitable number of images. In some embodiments, images can be captured repeatedly, e.g., at a predetermined frequency, to capture the surrounding environment of vehicle 100. In similar fashion, sensors 110 can be deployed in any suitable number and/or in any suitable location relative to vehicle 100.

In the example of FIG. 1, the illumination sources 121 are four-lamp headlamp assemblies. In particular embodiments, the illumination sources 121 can be positioned at the front of vehicle 100. As an example and not by way of limitation, the illumination sources 121 can be positioned at the position of a traditional headlamp assembly. It should be appreciated that, in various embodiments, the illumination sources 121 can include any suitable type or combination of illumination such as low-beam lights, high-beam lights, and fog lights. Further, as will be described in greater detail relative to FIGS. 2A-C and 3, in certain embodiments, the illumination sources 121 can be headlamp assemblies including any suitable number of headlamps such as, for example, one, two, three, four, five, and/or the like.

Control system 104 can enable control of various systems on-board the vehicle. Control system 104 can communicate with, and control operation of, illumination sources 121, cameras 120, and/or sensors 110. Example operation of control system 104 will be described in greater detail relative to FIG. 5.

Figure 2A:
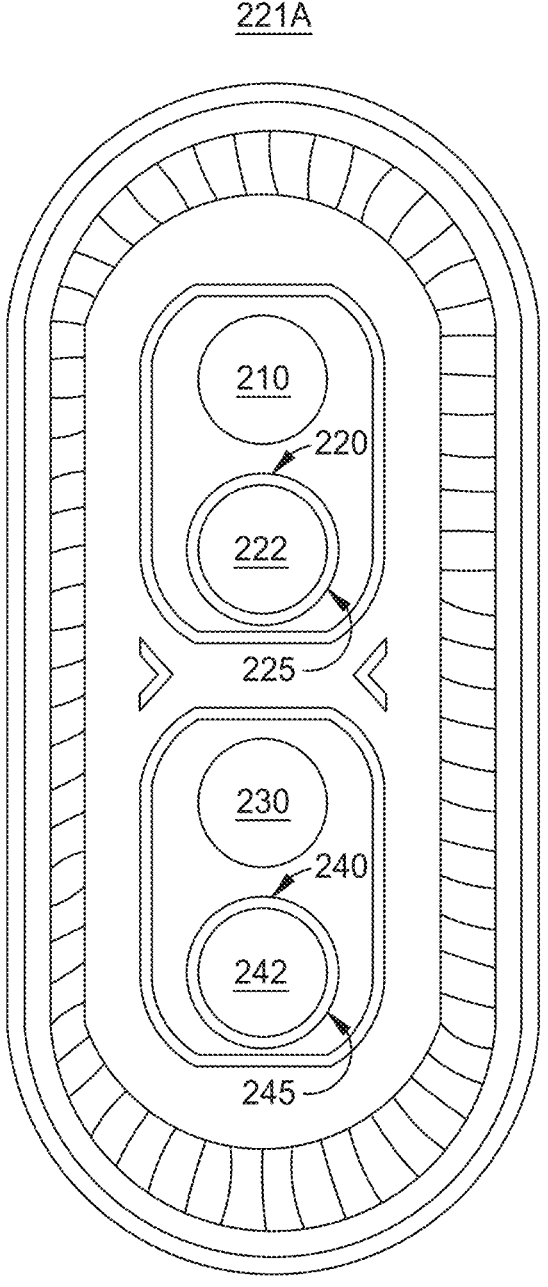
FIG. 2A illustrates an example four-lamp headlamp assembly, in accordance with certain embodiments of the present disclosure.

FIG. 2A illustrates an example four-lamp headlamp assembly 221A that, in certain embodiments, can correspond to one or more of the illumination sources 121 of FIG. 1. Laser low-beam lamp 210 can provide broad-spectrum incoherent white light. Laser low-beam lamp with infrared capabilities 220 can provide broad-spectrum incoherent white light and infrared spectrum light. Laser low-beam lamp with infrared capabilities 220 can be integrated into a single laser-based light source. Laser low-beam lamp with infrared capabilities can comprise laser low-beam 222 and infrared low-beam 225. Infrared low-beam 225 can be positioned as a ring about laser low-beam 222.

High-beam matrix lamp 230 can increase or decrease the brightness of a portion (e.g., a subfield) of the high-beam beam field. The high-beam matrix lamp can change the brightness of a portion of the high-beam beam field without changing the brightness of another portion of the high-beam beam field. When the portion of the high-beam beam field brightness is decreased, the power consumed by the high-beam matrix lamp may decrease.

Laser high-beam lamp with infrared capabilities 240 can provide broad-spectrum incoherent white light and infrared spectrum light. Laser high-beam lamp with infrared capabilities 240 can also include a high-beam boost lamp. The high-beam boost lamp can output light about one kilometer in distance. The high-beam boost lamp can also be integrated with the laser high-beam lamp such that the laser high-beam lamp operates as a laser high-beam lamp until high-beam boost is enabled. When high-beam boost is enabled, the integrated laser high-beam lamp can operate as a high-beam boost lamp.

Laser low-beam lamp with infrared capabilities 240 can be integrated into a single laser-based light source. Laser high-beam lamp with infrared capabilities 240 can include laser high-beam 242 and infrared high-beam 245. Laser high-beam 242 can also include the high-beam boost lamp. Infrared high-beam 245 can be positioned as a ring about laser high-beam with high-beam boost 242.

Laser low-beam lamp 210 or laser low-beam lamp with infrared capabilities 220 can output a broad-spectrum incoherent white light beam field with, by way of example and not limitation, a vertical beam spread of up to 25 degrees and the vertical beam spread can be 15 degrees above and 10 degrees below a horizontal center line of the white-light beam field. High-beam matrix lamp 230 or laser high-beam with infrared capabilities 240 can output a white light beam field with, by way of example and not limitation, a vertical beam spread of up to 10 degrees and the vertical beam spread can be 5 degrees above and 5 degrees below a horizontal center line of the white light beam field.

Figure 2C:
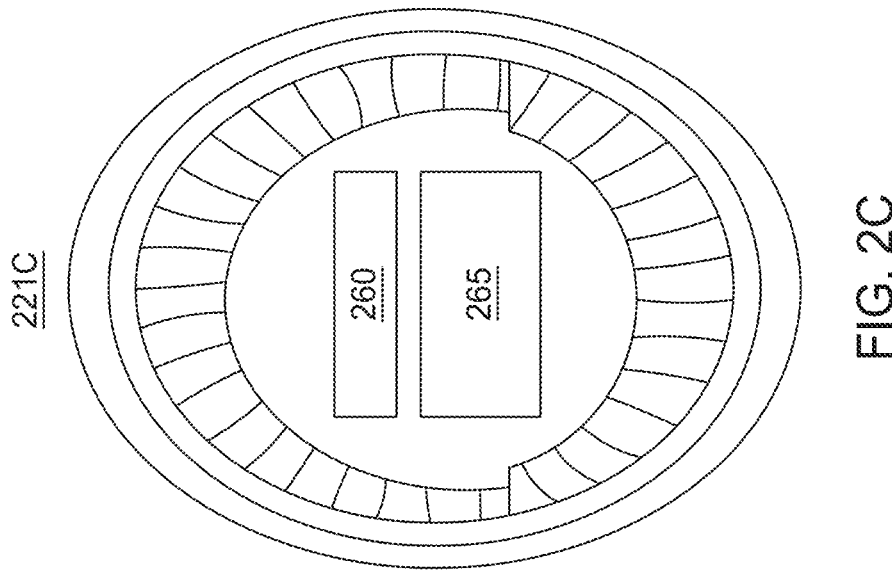
FIG. 2C illustrates an example two-lamp headlamp assembly, in accordance with certain embodiments of the present disclosure.
Figure 2B:
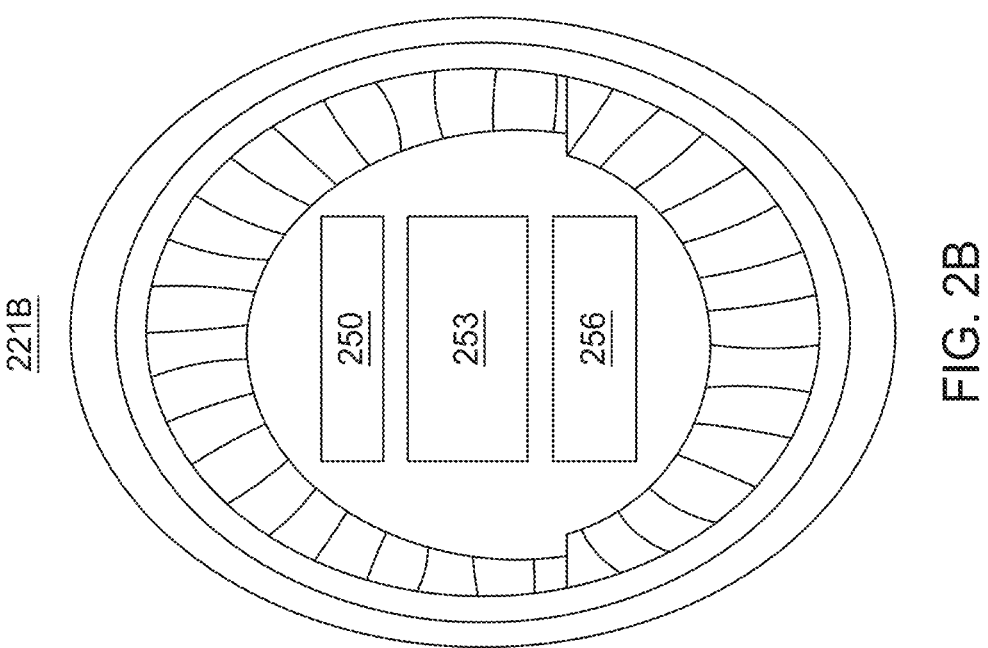
FIG. 2B illustrates an example three-lamp headlamp assembly, in accordance with certain embodiments of the present disclosure.

FIG. 2B illustrates an example three-lamp headlamp assembly 200B that, in certain embodiments, can correspond to one or more of the illumination sources 121 of FIG. 1. First lamp 250 can be a laser low-beam lamp 210, a laser low-beam lamp with infrared capabilities 220, a high-beam matrix lamp 230, or a high-beam laser lamp with infrared capabilities 240. Second lamp 253 can be a laser low-beam lamp 210, a laser low-beam lamp with infrared capabilities 220, a high-beam matrix lamp 230, or a high-beam laser lamp with infrared capabilities 240. Third lamp 256 can be a laser low-beam lamp 210, a laser low-beam lamp with infrared capabilities 220, a high-beam matrix lamp 230, or a high-beam laser lamp with infrared capabilities 240.

FIG. 2C illustrates an example two-lamp headlamp assembly 200C that, in certain embodiments, can correspond to one or more of the illumination sources 121 of FIG. 1. Top lamp 1560 can be a laser low-beam lamp 210, a laser low-beam lamp with infrared capabilities 220, a high-beam matrix lamp 230, or a high-beam laser lamp with infrared capabilities 240. Bottom lamp 265 can be a laser low-beam lamp 210, a laser low-beam lamp with infrared capabilities 220, a high-beam matrix lamp 230, or a high-beam laser lamp with infrared capabilities 240.

Figure 3:
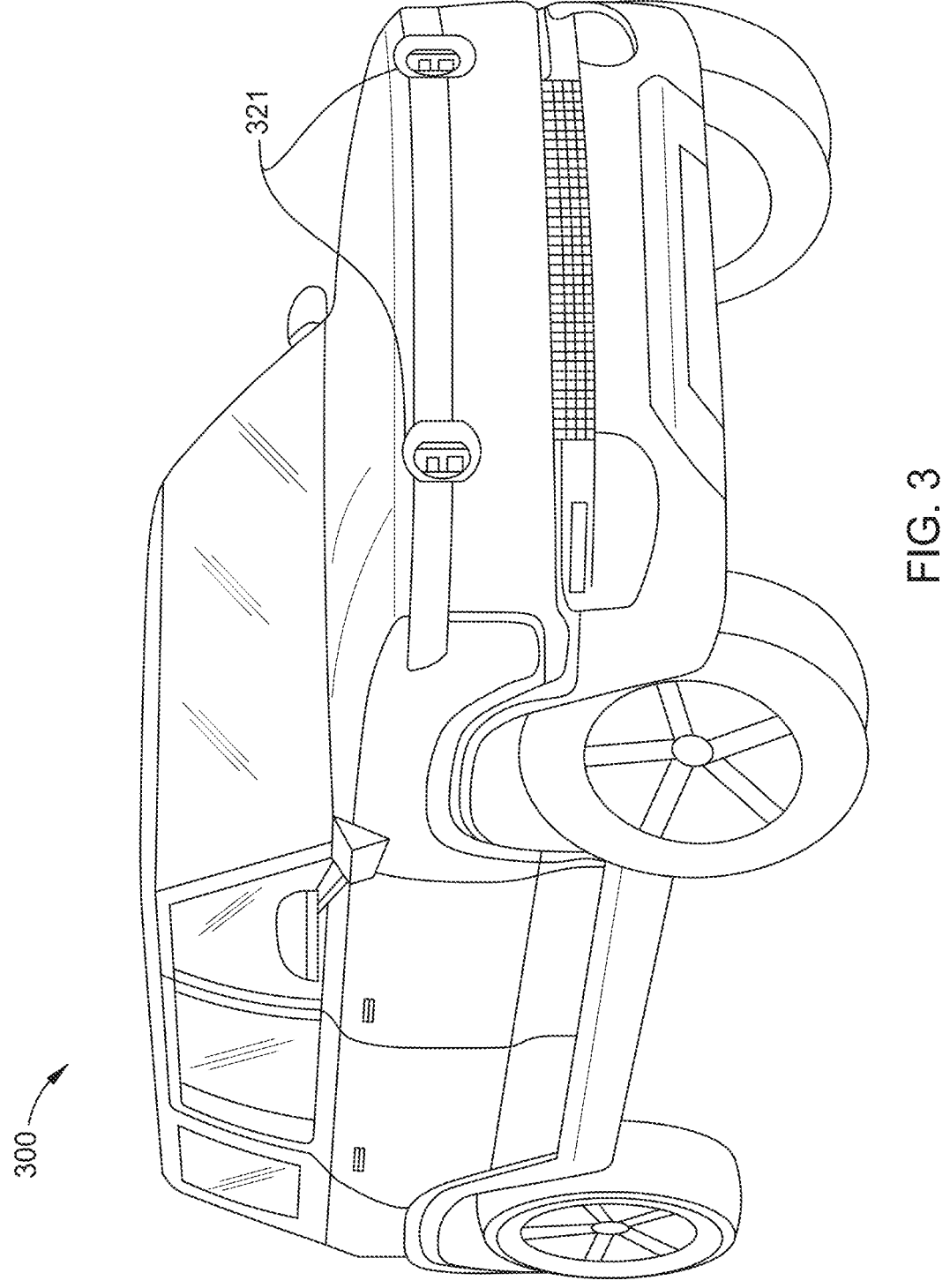
FIG. 3 illustrates an example of two-lamp headlamp assemblies integrated in a vehicle, in accordance with certain embodiments of the present disclosure.

FIG. 3 illustrates an example of two-lamp headlamp assemblies 321 integrated in vehicle 300. In particular embodiments, two-lamp headlamp assemblies 321 can be positioned at the front of vehicle 300. As an example and not by way of limitation, two-lamp headlamp assemblies 321 can be positioned at the positions of traditional headlamp assemblies. In some embodiments, two-lamp headlamp assemblies 321 can be smaller than, for example, the illumination sources 121 shown in FIG. 1 or traditional headlamp assemblies. For illustrative purposes, examples will be periodically described herein relative to the illumination sources 121 of FIG. 1. It should be appreciated, however, that the illumination sources 121 can include any suitable number of lamps for a given implementation, including, but not limited to, the example headlamp assemblies described relative to FIGS. 2A-B and 3.

Figure 4A:
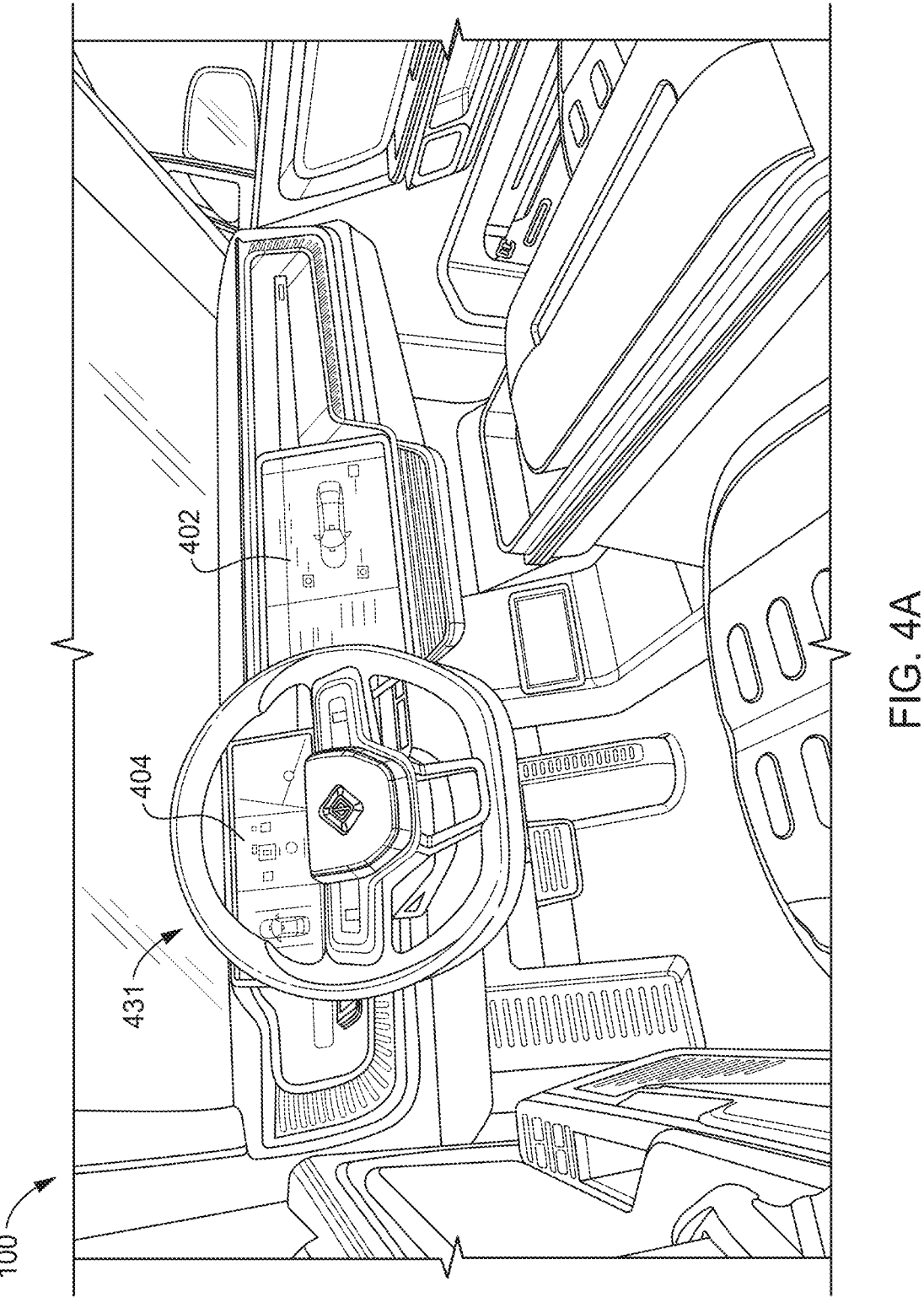
FIG. 4A illustrates examples of vehicle displays and controls that can be included in a vehicle, in accordance with certain embodiments of the present disclosure.

FIG. 4A illustrates examples of vehicle displays and controls that can be included in vehicle 100, in accordance with certain embodiments of the present disclosure. In the example of FIG. 4A, two front displays, namely, an infotainment display 402 and an instrument cluster 404, are shown, as well as a steering wheel control assembly 431. It should be appreciated that the vehicle displays and controls shown in FIG. 4A are merely illustrative. Other displays, such as one or more rear displays and/or additional front displays, can also be included. In similar fashion, other controls can be included in or around vehicle 100, including controls provided by the infotainment display 402 and/or the instrument cluster 404.

In certain embodiments, a vehicle display proximate the driver, such as the infotainment display 402, can facilitate alignment of the illumination sources in correspondence to directional input received via the steering wheel control assembly 431. In various embodiments, the directional input can be user input to adjust a position of the illumination sources 121 (e.g., move up, down, left, right, and/or the like). Examples will be described in greater detail relative to FIGS. 4B, 5, 6A, and 7A-B.

Figure 4B:
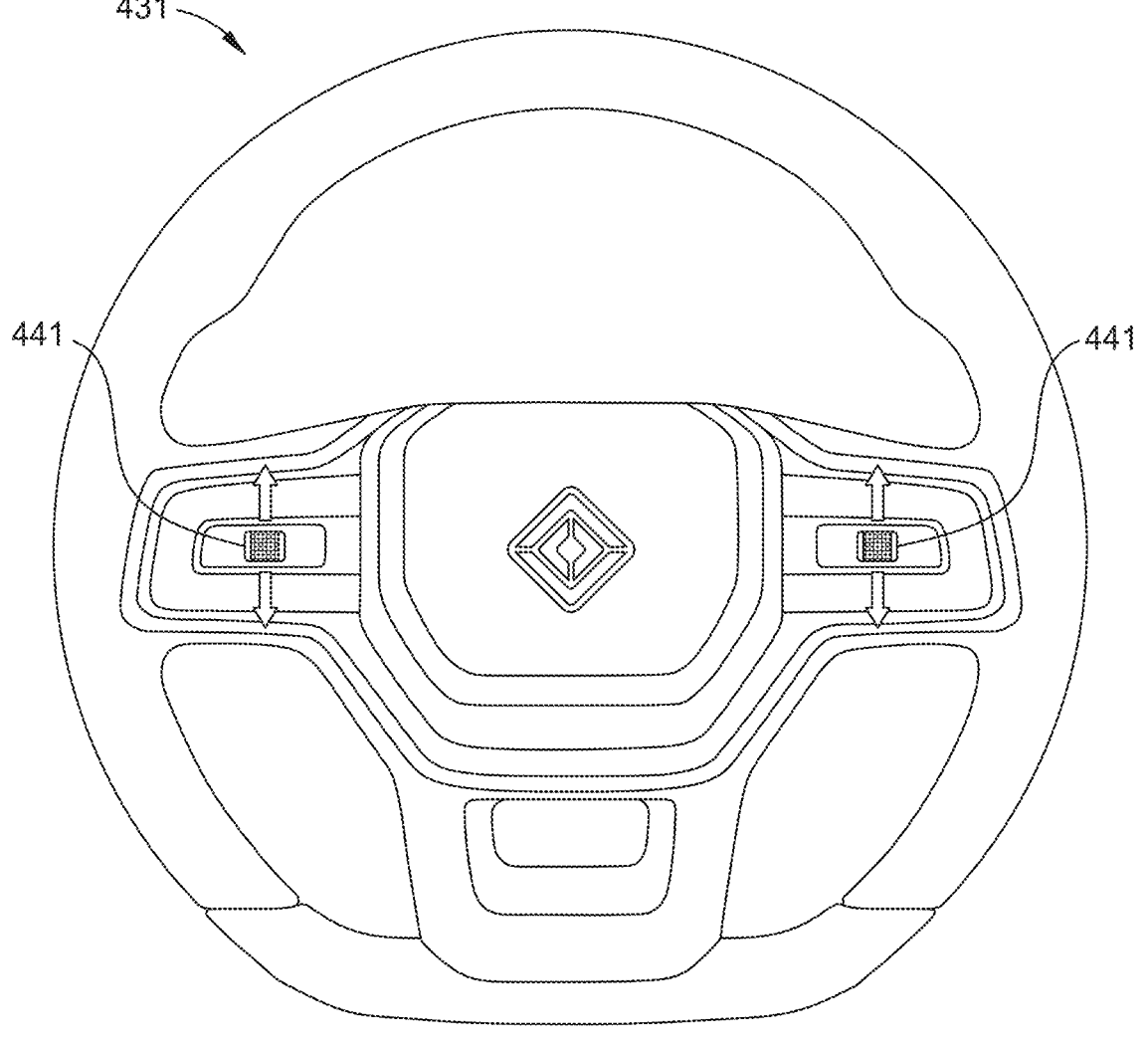
FIG. 4B illustrates an example of a steering wheel control assembly, in accordance with certain embodiments of the present disclosure.

FIG. 4B illustrates an example of the steering wheel control assembly 431 of FIG. 4A, in accordance with certain embodiments of the present disclosure. In the example of FIG. 4B, the steering wheel control assembly 431 includes user controls 441 operable to provide directional input, for example, in relation to the illumination sources 121. In the example of FIG. 4B, the user controls 441 are configured as thumbwheels operable to be manipulated, for example, by a user's thumb. For illustrative purposes, the user controls 441 are shown as being operable to roll up or down. However, in various embodiments, the user controls 441 may be operable to move (e.g., roll, pivot, slide, etc.) in any direction (e.g., up, down, left, right, etc.) to provide directional input, for example, in relation to the illumination sources 121.

For example, in some embodiments, one of the user controls 441 can control a horizontal position of the illumination sources 121 (e.g., up/down on the user controls 441 can correspond to leftward/rightward movement), while another of the user controls 441 can control a vertical position of the illumination sources 121 (e.g., up/down on the user controls 441 can correspond to upward/downward movement). In certain embodiments, one or both of the user controls 441 can be operable to roll sidewise or otherwise indicate, for example, desired movement (e.g., a direction or angle of pivot). In some cases, the user controls 441 can be a control stick that indicates the desired movement. In addition, or alternatively, the user controls 441 include separate buttons corresponding to particular directions of movement (e.g., left, right, up, and/or down). In addition, or alternatively, in certain embodiments, the user controls 441 can be situated at another suitable location within vehicle 100 (e.g., in or around a dash or windshield). In addition, or alternatively, in certain embodiments, the user controls 441 can be integrated into various displays, such as a touch-screen of the infotainment display 402.

For simplicity of description, examples will be periodically described herein with respect to the infotainment display 402 and the user controls 441. It should be appreciated, however, that the principles described herein are similarly applicable to other vehicle displays and/or user controls that can be proximate the driver or other users, or viewable and/or usable by the driver or other users. For example, the principles described herein are similarly applicable to displays and/or controls in or around a dash or windshield (e.g., the instrument cluster 404 and/or a rear display and controls associated therewith), and/or a display and/or controls of a mobile device. Other examples will be apparent to one skilled in the art after a detailed review of the present disclosure.

Figure 5:
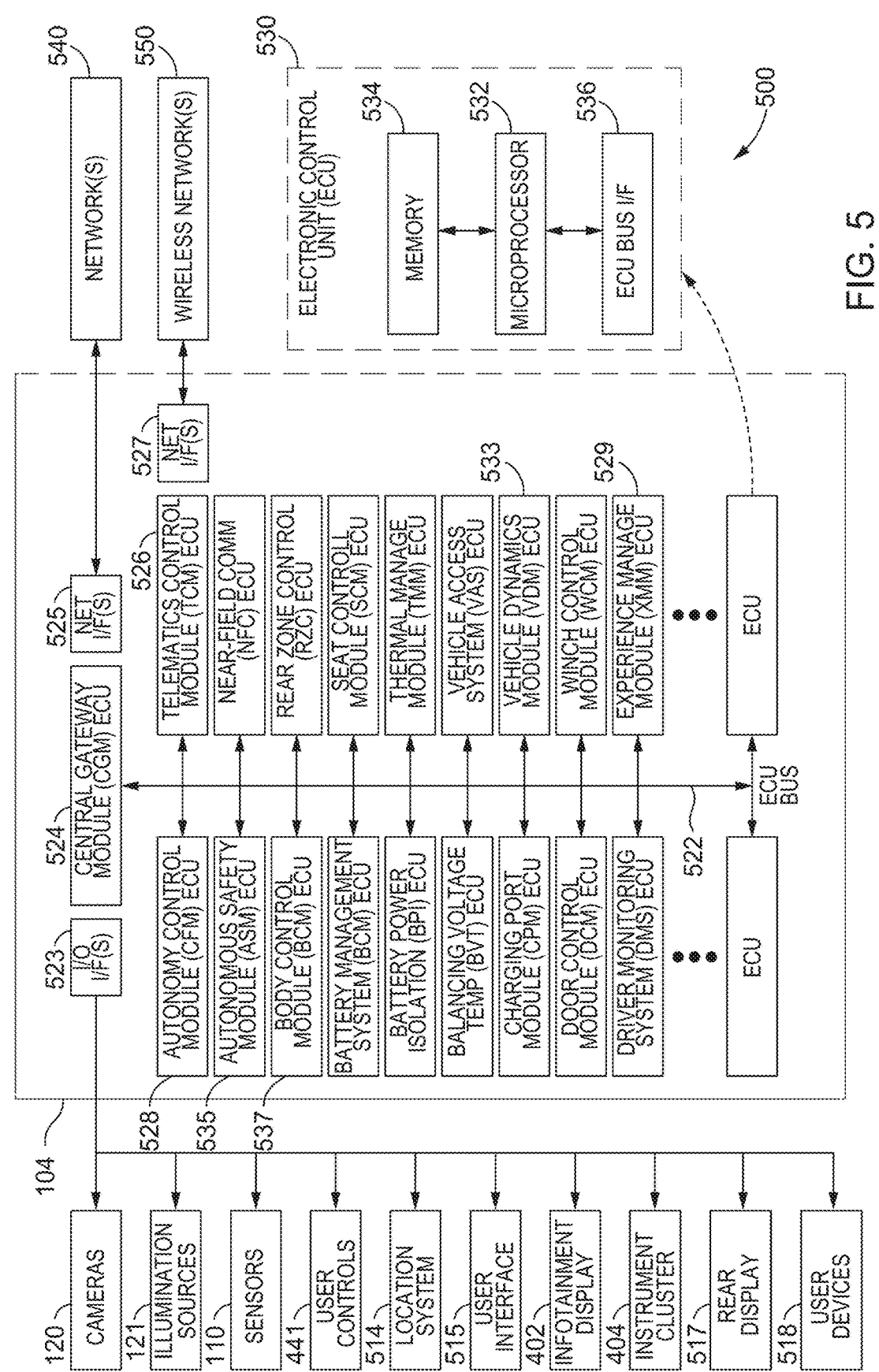
FIG. 5 illustrates a block diagram of example vehicle components, in accordance with certain embodiments of the present disclosure.

FIG. 5 illustrates a block diagram 500 of example components of vehicle 100, in accordance with certain embodiments of the present disclosure. As described relative to FIG. 1, vehicle 100 includes control system 104, where control system 104 is configured to perform the functions described relative to FIG. 1, as well as other functions for operation of vehicle 100. In many embodiments, control system 104 includes a number of electronic control units (ECUs) 530 coupled to ECU Bus 522. Each ECU 530 performs a particular set of functions, and includes, inter alia, micro-processor 532 coupled to memory 534 and ECU Bus I/F 536. In certain embodiments, control system 104 can include one or more system-on-chips (SOCs). Each SOC can include a number of multi-core processors coupled to a high-speed interconnect and on-chip memory, and can per-form a much larger set of functions than a single ECU 530.

Control system 104 is coupled to sensors, input/output (I/O) devices and actuators, as well as other components within a propulsion system, an energy storage system, and/or an accessory system. The sensors can include, for example, cameras 120, sensors 110, location system 514, etc. The I/O devices can include, for example, illumination sources 121, user interface 515, infotainment display 402, instrument cluster 404, rear display 517, user controls 441, user devices 518, etc. The actuators can include, for example, actuators (e.g., motors) that adjust positions of illumination sources 121. Additionally, control system 104 can be coupled to network(s) 540, network(s) 550, etc. In certain embodiments, one or more ECUs 530 can include the necessary interfaces to be coupled directly to particular sensors, I/O devices, actuators and other vehicle system components. User interface 515 can include, for example, any suitable manner of graphically presenting information to a user of vehicle 100. The user interface 515 can include, for example, infotainment display 402, instrument cluster 404, rear display 517, and/or user devices 518.

In many embodiments, control system 104 includes Central Gateway Module (CGM) ECU 524 which provides a central communications hub for vehicle 100. CGM ECU 524 includes (or is coupled to) I/O interfaces 523 to receive data, send commands, etc., to and from the sensors, I/O devices, actuators and other vehicle system components. CGM ECU 524 also includes (or is coupled to) network interface(s) 525 that provides network connectivity through Controller Area Network (CAN) ports, Local Interconnect Network (LIN) ports, Ethernet ports, etc.

For example, CGM ECU 524 can receive data from cameras 120, microphones 311, sensors 110, user controls 441 and location system 514, as well as user interface 515, and then communicate the data over ECU Bus 522 to the appropriate ECU 530. Similarly, CGM ECU 524 can receive commands and data from the ECUs 530 and send them to the appropriate I/O devices, actuators and vehicle components. For example, illumination sources 121, or a partial subset thereof, can be commanded to direct light. By way of further example, a graphical user interface (GUI) widget can be sent to user interface 515 (e.g., infotainment display 402, instrument cluster 404, rear display 517, and/or user devices 518), and video data from cameras 120 can be sent to infotainment display 402, instrument cluster 404, rear display 517, and/or user devices 518.

In certain embodiments, one or more functions and/or positions of the illumination sources 121 as described herein can be controlled by a Body Control Module (BCM) ECU 537. The BCM ECU 537 can provide electronic controls for various components of the body of the vehicle, such as, by way of example and not limitation: exterior lighting (e.g., headlamps, side lights, rear lights, camp lights) and interior lighting (e.g., cabin lights, seatbelt lights).

In certain embodiments, one or more functions and/or positions of the illumination sources 121 as described herein can be controlled in part by information provided by ECUs providing automated driving system (ADS) and/or an advanced driver assistance system (ADAS) functionality. The ADS and/or ADAS systems can be enabled by a driver of the vehicle to provide one or more functions to support driving assistance and/or automation. An Autonomy Control Module (ACM) ECU 528 can process data captured by cameras 120 and/or sensors 110. In some embodiments, the ACM ECU 528 can provide artificial intelligence functionality to provide and/or refine functions to support driving assistance and/or automation. For example, in some embodiments, the ACM ECU 528 provide inputs related to positions, or adjustments to positions, of the illumination sources 121. An Autonomous Safety Module (ASM) ECU 535 can provide functions to support driving safety by monitoring sensors that support self-driving functions.

In certain embodiments, one or more functions and/or positions of the illumination sources 121 as described herein can be controlled in relation to images displayed on a dashboard of the vehicle by an Experience Management Module (XMM) ECU 529. For example, the XMM ECU 529 can cause the illumination sources 121, individually or collectively, to direct light towards a target. In some cases, the target may correspond to a particular object or location, such as a wall. In other cases, the target may be defined as being away from a particular object or location (e.g., an oncoming car, or a location deemed to correspond to an oncoming car). The XMM ECU 529 can cause one or more images captured with the directed light to be displayed, for example, on the user interface 515 (e.g., on infotainment display 402, instrument cluster 404, rear display 517, and/or user devices 518). The displayed images can correspond, for example, to images captured by the cameras 120 and can be, for example, a live video feed.

In certain embodiments, the XMM ECU 529 can determine an input relative to the displayed images. The input can be, for example, a directional input from the user controls 441 (e.g., up, down, left, right, a combination of the foregoing, etc.). The XMM ECU 529 can trigger a positioning of the illumination sources 121, individually or collectively, based on the directional input. The triggered positioning can be an adjustment upward, downward, leftward, rightward, a combination of the foregoing and/or the like. In some embodiments, interactive controls provided by the XMM ECU 529 can enable interaction with other modules of control system 104. In some embodiments, functions of the ACM and the XMM ECU 529 can be combined together in an Autonomous experience Module (AXM) ECU.

In certain embodiments, one or more functions and/or positions of the illumination sources 121 as described herein can be controlled in part by information provided by a Vehicle Dynamics Module (VDM) ECU 533. The VDM ECU 533 can perform a number of different functions related to aspects of the vehicle's drivetrain, regenerative braking, suspension, steering, traction control, distribution of mass, aerodynamics, and driving modes. In some embodiments, the VDM ECU 533 can, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver. In some embodiments, the VDM ECU 533 can automatically trigger a positioning of the illumination sources 121 based on, or in response to, an adjusted ride height. In these embodiments, each ride height can be associated with particular positions (e.g., heights) of the illumination sources 121, such that in response to the adjusted ride height, the VDM ECU 533 can automatically cause the illumination sources 121, individually or collectively, to adjust to the associated position.

In certain embodiments, one or more functions and/or positions of the illumination sources 121 as described herein can be controlled in part by information provided by a Telematics Control Module (TCM) ECU 526. TCM ECU 526 can provide a wireless vehicle communication gateway for vehicle 100. TCM ECU 526 includes (or is coupled to) network interface(s) 527 that provides network connectivity to support functionality such as over-the-air (OTA) software updates, communication between vehicle 100 and the internet, communication between vehicle 100 and a computing device, in-vehicle navigation, vehicle-to-vehicle communication, communication between the vehicle and landscape features (e.g., automated toll road sensors, automated toll gates, power dispensers at charging stations), automated calling functionality, etc.

In various embodiments, control system 104 also includes, inter alia, Battery Management System (BMS) ECU, Battery Power Isolation (BPI) ECU, Balancing Voltage Temperature (BVT) ECU, Door Control Module (DCM) ECU, Driver Monitoring System (DMS) ECU, Near-Field Communication (NFC) ECU, Rear Zone Control (RZC) ECU, Seat Control Module (SCM) ECU, Thermal Management Module (TMM) ECU, Vehicle Access System (VAS) ECU, Winch Control Module (WCM) ECU, etc.

Figures 6A, 6B:
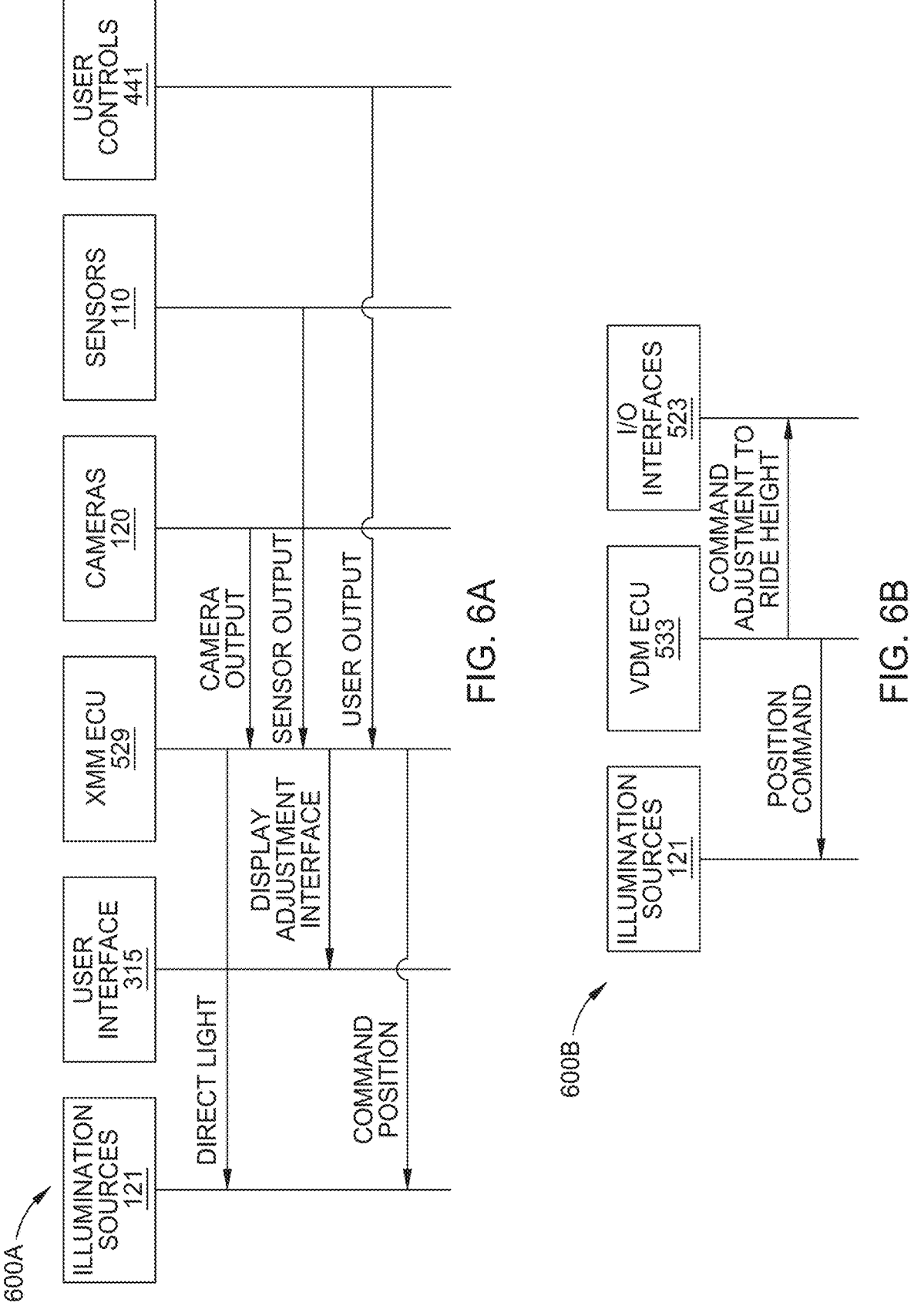
FIG. 6A illustrates an example of a sequence diagram for positioning illumination sources based on user input, in accordance with certain embodiments of the present disclosure.
FIG. 6B illustrates an example of a sequence diagram for positioning illumination sources automatically based on ride height, in accordance with certain embodiments of the present disclosure.

FIG. 6A illustrates an example of a sequence diagram 600A for positioning the illumination sources 121 based on user input and information received from the cameras 120, in accordance with certain embodiments of the present disclosure. Generally, the sequence diagram 600A depicts the illumination sources 121, the user interface 515, the XMM ECU 529, the cameras 120, the sensors 110, and the user controls 441. Although not explicitly indicated as such in FIG. 6A, it should be appreciated that the user interface 515, the XMM ECU 529, the ASM ECU 328, the cameras 120, and the sensors 110 can exchange any signals, commands or other data via, for example, the I/O interfaces 523 and/or the CGM ECU 524 as described relative to FIG. 5.

In certain embodiments, the XMM ECU 529 can, in parallel or in any suitable sequence, command one or more of the illumination sources 121 to direct light to an illumination target (e.g., a wall), receive camera output from the cameras 120, and receive sensor output from the sensors 110. In various embodiments, as further discussed below, the XMM ECU 529 can cause light to be directed from all or part of only one of the illumination sources 121 (e.g., all or part of only a left or right headlamp assembly is caused to emit a beam), or from all or part of two or more of the illumination sources 121 simultaneously (e.g., all or part of both left and right headlamp assemblies are caused to emit beams).

In an example, in some embodiments, the XMM ECU 529 can cause light to be directed from only a selected illumination source of the illumination sources 121 (e.g., a left or right headlamp assembly selected by a user or the control system 104). In some of these embodiments, the XMM ECU 529 can thereby facilitate individual positioning of the selected illumination source, such that any others of the illumination sources 121 can be individually positioned in a similar way in a separate positioning process. In others of these embodiments, the XMM ECU 529 can treat the selected illumination source (e.g., the left headlamp assembly) as representative of all of the illumination sources 121 (e.g., both left and right headlamp assemblies), such that another illumination source (e.g., the right headlamp assembly) can be positioned in tandem with the selected illumination source (e.g., the left and right headlamp assemblies can be positioned simultaneously in the same manner). In certain embodiments, positioning the illumination sources 121 in tandem can be useful for vertical adjustments.

In another example, in some embodiments, the XMM ECU 529 can cause light to be directed from all of the illumination sources 121 simultaneously (e.g., from both left and right headlamp assemblies). In some of these embodiments, the XMM ECU 529 can position the illumination sources 121 together in corresponding fashion (e.g., the left and right headlamps can move up, down, left, and right together). In others of these embodiments, the illumination sources 121 can each be associated with separate user controls (e.g., left and right controls of the user controls 441), such that the illumination sources 121 can each be individually adjusted.

In addition, or alternatively, the XMM ECU 529 can command only a partial subset of the illumination sources 121 to direct light to the illumination target (e.g., a wall). In various embodiments, commanding only a partial subset of the illumination sources 121 to direct light results in a narrower beam and thus simplifies the positioning thereof. The partial subset can correspond to any individually addressable segment of each of the illumination sources 121.

In various examples, the partial subset can correspond to a segment of one or more bulbs, a segment of one or more light-emitting diodes (LEDs), a segment of one or more laser lights, and/or the like. In other examples, if the illumination sources 121 each include more than one headlamp as discussed relative to FIGS. 1, 2A-C and 3, the partial subset can correspond to a selected headlamp or headlamps (e.g., a middle headlamp, a middle two headlamps, etc.). Other examples will be apparent to one skilled in the art after a detailed review of the present disclosure.

Although light can be directed from all or part of one, or more than one, of the illumination sources 121, for simplicity of description, examples will be described relative to the illumination sources 121. It should be appreciated, however, that each such reference to the illumination sources 121 may, in various embodiments, refer to an individual illumination source or to two or more illumination sources 121 in any of the ways discussed previously. In similar fashion, it should be appreciated that references to directed light from the illumination sources 121 may, in various embodiments, refer to directed light from partial subsets of the illumination sources 121 as discussed previously.

In certain embodiments, the camera output received by the XMM ECU 529 includes one or more images providing a view of the directed light on the illumination target. In certain embodiments, the one or more images can correspond to a live video feed that is provided to the XMM ECU 529 as a continuous stream. The sensor output received by the XMM ECU 529 can indicate, for example, an orientation of vehicle 100 (e.g., an angle of vehicle 100 relative to the illumination target and/or whether vehicle 100 is on level ground). In some cases, the sensor output can be omitted.

Based on the sensor output and/or the camera output, the XMM ECU 529 can command the user interface 515 (e.g., the infotainment display 402, the instrument cluster 404, the rear display 517, and/or one or more of the user devices 518) to display an interface to adjust a position of the illumination sources 121. The displayed interface can include, for example, the received camera output. For example, in certain embodiments, the displayed interface can include a live video feed of the directed light on the illumination target. In some cases, the displayed interface can include a visually indicated region of interest for the illumination source (e.g., a suggested region for the directed light so the user can easily view whether the illumination sources 121 are appropriately positioned).

In certain embodiments, the XMM ECU 529 can receive, from the user controls 441, a user input relative to the one or more images displayed on the user interface 515. The user input can indicate, for example, a direction of movement (e.g., direction of pivot) for the illumination sources 121. The desired direction of movement can be, for example, up, down, left, right, or a combination thereof. The XMM ECU 529 commands the illumination sources 121 to adjust their position based on the user input. For example, the XMM ECU 529 can command the illumination sources to move up, down, left, right, or a combination thereof, in correspondence to the desired direction of movement.

FIG. 6B illustrates an example of a sequence diagram 600B for positioning the illumination sources 121 automatically based on ride height, in accordance with certain embodiments of the present disclosure. Generally, the sequence diagram 600A depicts the illumination sources 121, the VDM ECU 533, and the I/O interfaces 523. Although not explicitly indicated as such in FIG. 6A, it should be appreciated that the illumination sources 121 and the VDM ECU 533 can exchange any signals, commands or other data via, for example, the I/O interfaces 523 and/or the CGM ECU 524 as described relative to FIG. 5.

The VDM ECU 533 issues a command, via the I/O interfaces 523, to adjust a ride height of the vehicle 100. In some embodiments, the adjustment to ride height may be user-initiated. In various cases, as discussed previously, each ride height can be associated with particular positions (e.g., heights) of the illumination sources 121. In response to the adjusted ride height, the VDM ECU 533 commands the illumination sources 121 to adjust to the associated positions, in correspondence to the adjusted ride height.

Figure 7A:
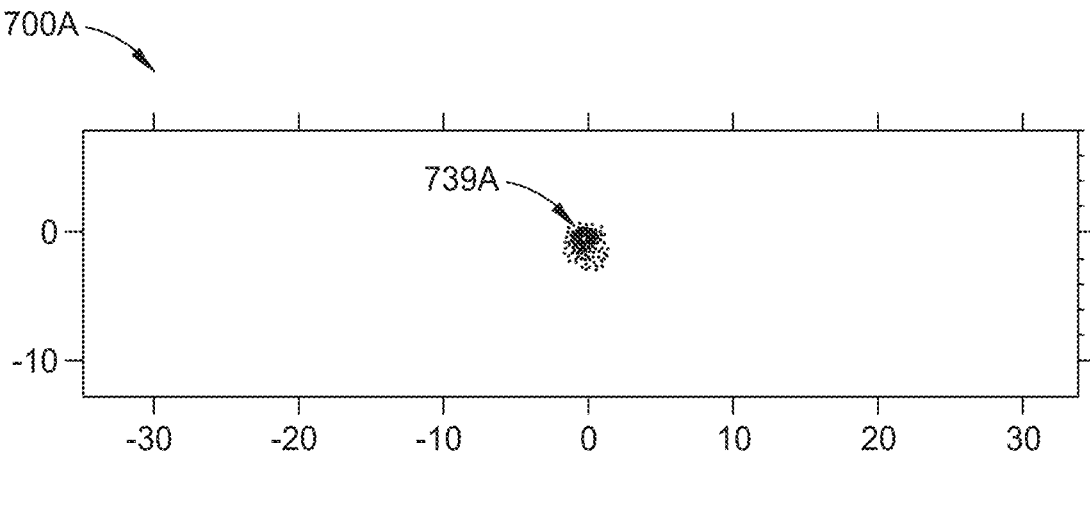
FIG. 7A illustrates an example of an interface that may be presented to a user, in accordance with certain embodiments of the present disclosure.
Figure 7B:
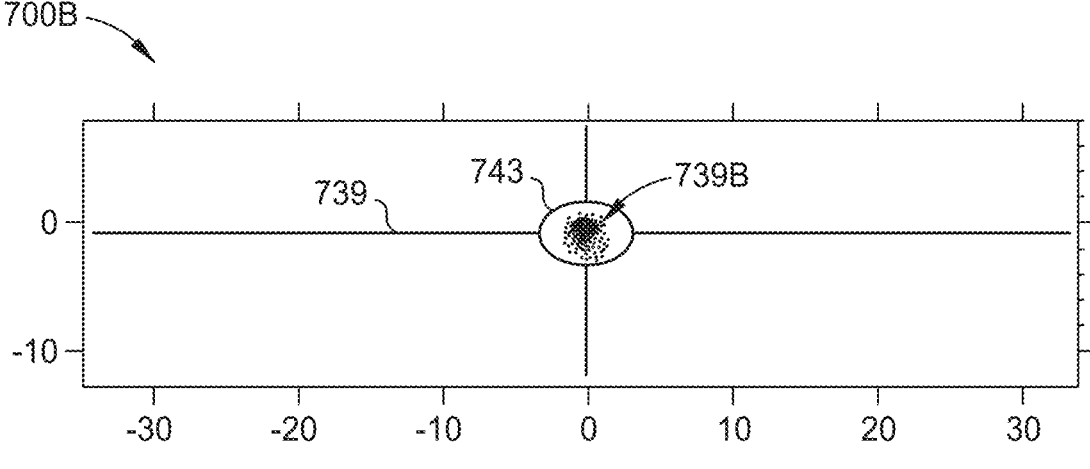
FIG. 7B illustrates another example of an interface that may be presented to a user, in accordance with certain embodiments of the present disclosure.

FIGS. 7A-B illustrate examples of interfaces to adjust positions of the illumination sources 121 of FIG. 1. In particular, FIG. 7A illustrates an interface 700A that may be presented on the user interface 515 (e.g., on infotainment display 402, instrument cluster 404, rear display 517, and/or user devices 518). In the example of FIG. 7A, the interface 700A includes a live video feed of a beam 739A. The beam 739A can correspond, for example, to directed light from any of the illumination sources 121 as discussed previously.

As described above, the interface 700A can be displayed, or caused to be displayed, by the XMM ECU 529. Thereafter, the XMM ECU 529 can receive, via the user controls 441, user input relative to the live video feed. A user can manipulate the user controls 441 of FIG. 4, for example, to provide the user input. The XMM ECU 529 can command the illumination sources 121 to adjust their position based on the user input. Updated positions can be immediately reflected, in real time, in the live video feed shown on the interface 700A.

FIG. 7B illustrates an interface 700B that may be presented on the user interface 515 (e.g., on infotainment display 402, instrument cluster 404, rear display 517, and/or user devices 518). In the example of FIG. 7B, the interface 700B includes a live video feed of a beam 739B. The beam 739B can correspond, for example, to directed light from any of the illumination sources 121 as discussed previously. As described above, the interface 700B can be displayed, or caused to be displayed, by the XMM ECU 529.

In the example of FIG. 7B, the interface 700B includes a cross-hair overlay 739 on the live video feed of the beam 739B. The cross-hair overlay 739 visually indicates a region of interest 743 for the illumination sources 121. In this way, the live video feed of the beam 739B is displayed together with the region of interest 743. Thereafter, the XMM ECU 529 can receive, via the user controls 441, user input relative to the region of interest 743. A user can manipulate the user controls 441 of FIG. 4, for example, to provide the user input. The XMM ECU 529 can command the illumination sources 121 to adjust their position based on the user input. Updated positions can be immediately reflected, in real time, in the live video feed shown on the interface 700B. In various embodiments, the user can continue to provide additional user input until the interface 700B shows the beam 739B inside the region of interest 743. In other embodiments, the interface 700B may include any type of visualization (e.g., one or more lines, circles, grids, images, etc.) that is overlaid on the live video feed of the beam 739B to indicate to the user a region of interest for aligning or otherwise configuring the illumination sources 121.

Figure 8:
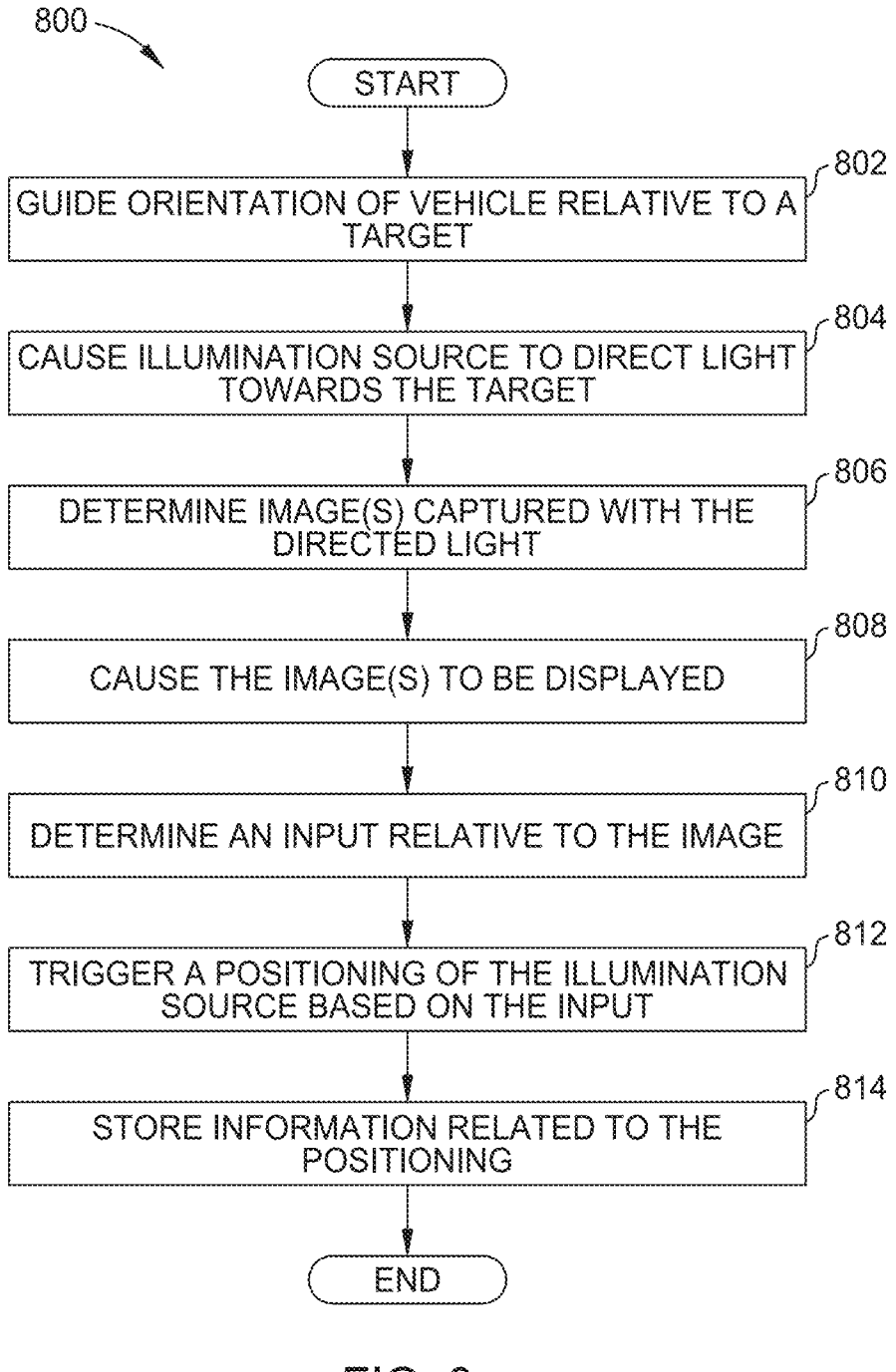
FIG. 8 illustrates an example of a process for configuring an illumination source associated with a vehicle, in accordance with certain embodiments of the present disclosure.

FIG. 8 illustrates an example of a process 800 for configuring an illumination source associated with a vehicle, such as vehicle 100, in accordance with certain embodiments of the present disclosure. In various embodiments, the process 800 can enable the illumination source to have different positions, for example, for different ride heights and/or different drive modes of vehicle 100. In certain embodiments, the process 800 can be implemented by any vehicle system that can process data. Although any number of systems, in whole or in part, can implement the process 800, to simplify discussion, the process 800 will be described in relation to the control system 104 of vehicle 100 as described relative to FIGS. 1, 4A-B, 5, 6A-B, and 7A-B.

At block 802, the control system 104 guides a user in orienting vehicle 100 relative to an illumination target. In some embodiments, the block 802 can include, for example, the control system 104 verifying that vehicle orientation criteria is satisfied. In an example, the orientation criteria can include, for example, a requirement related to a distance of vehicle 100 from the illumination target (e.g., a requirement that vehicle 100 be at least 20 feet from the target, between 15 and 25 feet from the target, etc.). In another example, the orientation criteria can include a requirement related to an angle of vehicle 100 relative to the illumination target (e.g., a requirement that vehicle 100 not be on an incline or decline of more than 10 degrees, 20 degrees, etc.). In various embodiments, the control system 104 can verify the distance of vehicle 100 from the illumination target and/or the angle of vehicle 100 relative to the illumination target via outputs of the cameras 120 and/or the sensors 110.

In certain embodiments, the control system 104 can guide the user, for example, via the user interface 515, until the vehicle 100 satisfies the orientation criteria. For example, the control system 104 can advise the user that vehicle 100 is too close to or too far from the illumination target. In other examples, the control system 104 can advise the user that vehicle 100 is at too great of an angle relative to the illumination target. In this way, the user is provided with feedback, enabling the user to reorient vehicle 100 in a manner that improves the accuracy with which the illumination source(s) are aligned or otherwise configured.

At block 804, the control system 104 causes the illumination source to direct light towards the illumination target. As discussed previously relative to FIG. 6A, the illumination source can correspond to any one or more of the illumination sources 121 of FIG. 1. In addition, or alternatively, as discussed previously relative to FIG. 6A, the block 804 can include causing only a partial subset of the illumination source to direct light towards the illumination target.

At block 806, the control system 104 determines one or more images captured with the directed light. For example, the control system 104 can receive the one or more images as an output of one or more of the cameras 120, as discussed relative to FIG. 6A. The one or more images can correspond, for example, to a live video feed of the directed light on the illumination target, as also discussed relative to FIG. 6A.

At block 808, the control system 104 causes the one or more images to be displayed on the user interface 515 (e.g., on infotainment display 402, instrument cluster 404, rear display 517, and/or user devices 518). For example, as discussed relative to FIG. 6A, the control system 104 can cause the user interface 515 to display an interface to adjust a position of the illumination source. In some embodiments, the displayed interface can include or be similar to the interfaces 700A or 700B of FIGS. 7A and 7B, respectively.

At block 810, the control system 104 determines an input relative to the one or more images displayed on the user interface 515. The block 808 can include, for example, receiving a user input from the user controls 441, for example, as discussed relative to FIGS. 4A-B, 5, 6A, and 7A-B.

At block 812, the control system 104 triggers a positioning of the illumination source based on the user input. The triggering at the block 810 can include, for example, commanding the illumination source to move up, down, left, right, or a combination thereof, in correspondence to the user input, for example, as discussed relative to FIG. 6A. In various embodiments, an updated position of the illumination source is reflected immediately, in real time, on the user interface 515, for example, via the live video feed discussed relative to the block 808. In various embodiments, the blocks 810 and 812 can be repeated until, for example, the live video feed reflects that the illumination source is directing light within a region of interest, for example, as discussed relative to FIG. 7B.

At block 814, the control system 104 stores information related to the positioning in memory associated therewith, such as in the memory 534 of any of the ECUs 530 of FIG. 5. The information can include, for example, coordinates or other information indicating a current position of the illumination source. In certain embodiments, the information can be stored in relation to a current ride height of vehicle 100 and/or in relation to a particular vehicle drive mode (e.g., road, sport, off-road, all-purpose, rally, rock crawl, sand, snow/ice, etc.), where each drive mode may correspond to a particular ride height of vehicle 100. After block 814, the process 800 ends.

In various embodiments, the process 800 can be repeated for multiple ride heights and/or drive modes of vehicle 100. In these embodiments, each of a plurality of ride heights and/or drive modes of vehicle 100 can be associated, in memory of the control system 104, with information related to a corresponding position of the illumination source. In various embodiments, the control system 104 can retrieve and display, on demand, for a given ride height and/or drive mode, the corresponding position of the illumination source. In some embodiments, the control system 104 can treat the associations as preset positions of the illumination source for the corresponding ride heights and/or drive modes. In some of these embodiments, whenever vehicle 100 returns to a given ride height and/or drive mode, control system 104 can automatically return the illumination source to the corresponding position, for example, as described relative to FIG. 6B. In others of these embodiments, the control system 104 can present the corresponding position to the user as a suggestion, for example, on the user interface 515.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method of configuring an illumination source associated with a vehicle, the method comprising:
   causing, by a vehicle control system, the illumination source to direct light towards a target;
   determining, at the vehicle control system, at least one image captured with the directed light;
   causing, by the vehicle control system, the at least one image to be displayed;
   determining, at the vehicle control system, an input relative to the at least one image; and
   triggering, by the vehicle control system, an aiming adjustment of the illumination source based on the input.

2. The method of claim 1, wherein the causing the illumination source to direct light towards the target comprises causing only a partial subset of the illumination source to direct light towards the target to narrow a beam of the directed light.

3. The method of claim 1, wherein the aiming adjustment comprises moving the illumination source in at least one of an upward, downward, leftward, or rightward direction.

4. The method of claim 1, wherein the at least one image comprises a live video feed of the directed light on the target, and the input is relative to the live video feed.

5. The method of claim 1, wherein the at least one image is displayed on an infotainment screen together with a visually indicated region of interest for the illumination source, and the input is relative to the visually indicated region of interest.

6. The method of claim 1, further comprising guiding, by the vehicle control system, a user in orienting the vehicle relative to the target, wherein the causing the illumination source to direct light towards the target is performed responsive to the guiding.

7. The method of claim 6, wherein the guiding comprises verifying at least one of a distance of the vehicle from the target or an angle of the vehicle relative to the target.

8. The method of claim 1, further comprising storing, by the vehicle control system, information related to the aiming adjustment in memory associated with the vehicle.

9. The method of claim 1, further comprising storing, by the vehicle control system, information related to the aiming adjustment in association with at least one of a ride height of the vehicle or a drive mode of the vehicle, wherein the ride height of the vehicle is variable.

10. The method of claim 1, wherein the input comprises a vertical adjustment to a position of the illumination source.

11. The method of claim 4, wherein the live video feed updates in real time to reflect the aiming adjustment.

12. The method of claim 5, wherein the determining the input and the triggering the aiming adjustment are repeated until the directed light is displayed within the visually indicated region of interest.

13. The method of claim 1, wherein the determining an input comprises receiving the input via a thumb control disposed in relation to a steering wheel.

14. An illumination configuration system for a vehicle, the illumination configuration system comprising:
   an illumination source of the vehicle;
   a vehicle control system associated with the vehicle and communicatively coupled to the illumination source, wherein the vehicle control system is configured to:
      cause the illumination source to direct light towards a target;
      determine at least one image captured with the directed light;
      cause the at least one image of the directed light to be displayed;
      determine an input relative to the at least one image; and
      trigger an aiming adjustment of the illumination source based on the input.

15. The illumination configuration system of claim 14, further comprising a vehicle camera configured to provide the at least one image to the vehicle control system, wherein the at least one image comprises a live video feed that updates in real time to reflect the aiming adjustment.

16. The illumination configuration system of claim 14, wherein the causing the illumination source to direct light towards the target comprises causing only a partial subset of the illumination source to direct light towards the target to narrow a beam of the directed light.

17. The illumination configuration system of claim 16, wherein the partial subset comprises at least one of a bulb, a light-emitting diode, or a laser light.

18. The illumination configuration system of claim 14, further comprising a thumb control disposed in relation to a steering wheel of the vehicle, wherein the input is received via the thumb control.

19. The illumination configuration system of claim 14, wherein the vehicle control system is further configured to store information related to the aiming adjustment in association with at least one of a ride height of the vehicle or a drive mode of the vehicle, wherein the ride height of the vehicle is variable.

20. A computer-program product comprising a non-transitory computer-usable medium having computer-readable program code embodied therein, the computer-readable program code adapted to be executed to implement a method comprising:

causing an illumination source associated with a vehicle to direct light towards a target;

determining at least one image captured with the directed light;

causing the at least one image to be displayed;

determining an input relative to the at least one image; and triggering an aiming adjustment of the illumination source based on the input.

\* \* \* \* \*